(No Model.)

J. F. WILMOT.
MIRROR FRAME.

No. 517,131. Patented Mar. 27, 1894.

Witnesses:
R. J. Jacker.
Flora L. Brown.

Inventor:
John F. Wilmot,
By Charles Turner Brown,
Atty.

THE NATIONAL LITHOGRAPHING COMPANY,
WASHINGTON, D. C.

UNITED STATES PATENT OFFICE.

JOHN F. WILMOT, OF CHICAGO, ILLINOIS, ASSIGNOR TO THE A. H. ANDREWS & COMPANY, OF SAME PLACE.

MIRROR-FRAME.

SPECIFICATION forming part of Letters Patent No. 517,131, dated March 27, 1894.

Application filed January 10, 1893. Serial No. 457,876. (No model.)

*To all whom it may concern:*

Be it known that I, JOHN F. WILMOT, a citizen of the United States, residing at Chicago, in the county of Cook and State of Illinois, have invented certain new and useful Improvements in Mirror-Frames, of which the following, when taken in connection with the drawings accompanying and forming a part hereof, is a full and complete description, sufficient to enable those skilled in the art to which it appertains to understand and make the same.

My invention relates to the manner of framing mirrors.

The device embodying my invention comprises a stationary base, a box-like part pivoted to the base in such manner as to permit of its being tilted into any position between the vertical and horizontal, an oblong mirror, and means for attaching its frame to its support, (such support being the movable box-like part above referred to.) By making the tilting part of the device box-like and attaching the oblong mirror frame thereto so that the mirror can be revolved in a plane parallel to the plane in which such tilting part is at any time I am enabled to so construct the device that it shall at the same time be adapted to serve as the frame of a bed or other article of furniture; and in practice my invention is particularly fitted to be employed in the manufacture of a combined mirror and bed frame, such frame not being of extreme height, while the mirror thereof can be adjusted so as to be of sufficient height to permit a full length view of the person in front thereof, or again adjusted to permit the view of many persons seated in front thereof; and so that the mirror can be placed in a horizontal position, (as when the bed inclosed in the box like part of the device is in use as a bed,) with no part of the mirror or frame thereof extending beyond the substantially built part thereof, and so not exposed to breakage.

No means are described or illustrated by me in this specification for maintaining the box like part of the device embodying my invention in any of the possible positions thereof between the vertical and horizontal, and where means therefor are provided the same form no part of this invention and are not to be read into the claims hereof.

I have illustrated my invention by the drawings referred to and accompanying and forming a part hereof, in which—

Figure 1:
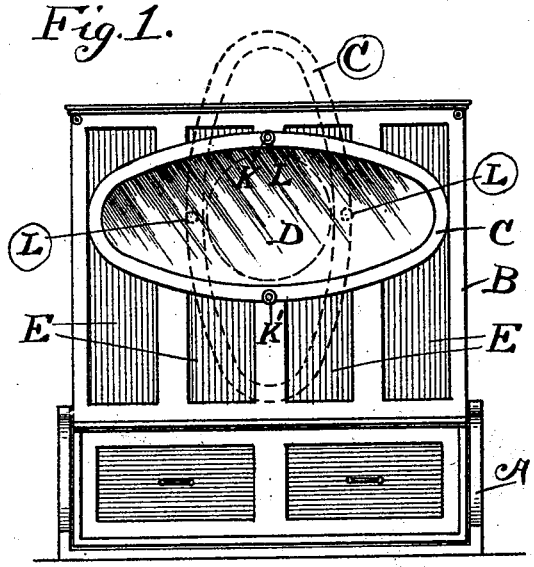
Figure 2:
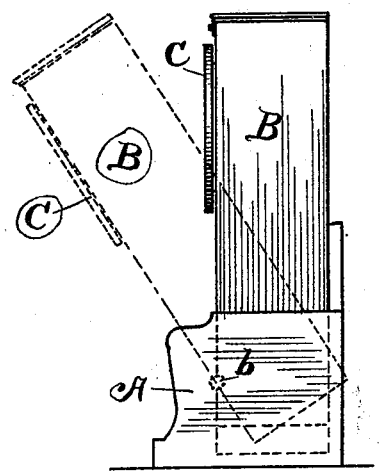
Figure 3:
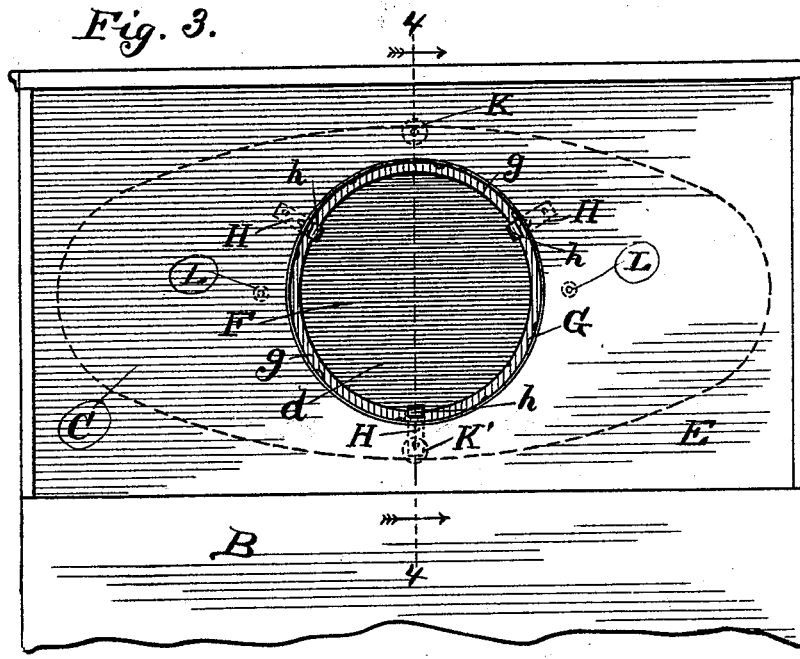

Figure 1, is a front elevation of a frame embodying my invention; Fig. 2 a side elevation thereof; Fig. 3 a rear elevation thereof on an enlarged scale; and Fig. 4 a sectional view on line 4—4 of Fig. 3, viewed in the direction indicated by the arrows.

The same letter of reference is used to indicate a given part where more than one view thereof is contained in the several figures of the drawings.

The device embodying my invention consists of a base, a tilting part and the mirror frame proper, lettered respectively, A, B, and C, for the several parts.

As will be observed by the drawings, Fig. 2, part B of the device can be adjusted on pivot $b$ so that it will be contained in a vertical plane, or, when desired can be brought forward so as to be in an inclined plane.

Part B of the device serves to contain a bed, or other article of furniture, when desired.

Movable part C of the device is immediately adjacent to the mirror and is pivoted or fulcrumed, to part B of the frame. The axis of the central point around which the part C of the device embodying my invention rotates or turns is at right angles to the axis around which the part B rotates or turns, when the part B is in a vertical position. In Fig. 1 the position of the frame C is shown in full lines when the mirror is held so that no part thereof shall project beyond the part B of the device. When in this position the part B of the device can be turned on the fulcrum $b$ so that it will be contained in a horizontal plane, and serve as a bed frame, without danger of breaking the mirror.

The position of the mirror when the same is held so as to give a full length view of the person standing before it, and so that a portion of the frame C shall extend beyond part B of the device is indicated in Fig. 1 by the dotted lines.

Figure 4:
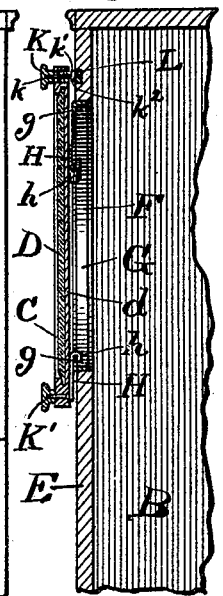

The manner which I have found the best adapted to attach frame C of the device to part B thereof is well illustrated in Figs. 3 and 4 of the drawings.

D, is a mirror.

d, is the backing of mirror D, and is firmly secured in part C.

E, is a filling in frame B, forming a front, having, preferably an ornamented appearance and adapted to cover or conceal whatever is placed back thereof in part B, as a bed, or other article of furniture.

F, is a hole, which I prefer to use, cut in the front or filling E, and in which, flanged ring G is inserted and secured thereby in part B.

$g$, is the flange of ring G.

H, H, H, are clasps concentrically secured to backing $d$, in frame C.

$h$, is the part of clasps H, adapted to engage with flange $g$, of ring G, and thereby hold back $d$ and frame C, with contained mirror C, firmly in place in a plane parallel with the plane in which filling E of part B is contained, while, at the same time permitting frame C to be turned. In the turning of the frame C clasps H travel on flange $g$ of ring G. Any desired number of these clasps H can be used, more than three, even to the extent as to cause such clasps to constitute, substantially a second ring; but as an equal degree of firmness and less friction is obtained by the use of three such clasps, I prefer to employ that number.

By using the hereinbefore described means of attaching frame C to part B, rapid wear and consequent looseness and swaying of frame C when turned is avoided, and hence there is no liability of frame C or backing $d$ thereof coming in contact with and marring the front or filling E of part B. I therefore prefer this means of attaching frame C to part B, rather than the use of an ordinary pivot and socket secured to the respective parts B and C, particularly where the part B is designed to be employed for a frame for a bed or other household article, as in such case the pivot would necessarily be of short length and liable to become loose, by wear, in the socket thereof. Besides this I have found that where the clasps and flanged rings described are used, too great friction will not be occasioned in the turning of the frame C, but on the contrary, sufficient friction is obtained to prevent such sudden turning of the frame C as to cause breakage of the mirror D in the use of the device.

K, K', are handles in frame C, by which I prefer to operate such frame.

$k$, is the spindle, on which handle K is rigidly secured.

$k'$, is a flange on spindle $k$, and $k^2$ is a spring, one end of which abuts against frame C and the other end against flange $k'$, such spring thereby yieldingly holding spindle $k$ in engagement with some one of the holes L, L, when frame C is turned so that such spindle is brought over any one of such holes.

In order to turn the frame C, handle K is drawn forward so that the spindle $k$ thereof will not be in engagement with hole L, or any one thereof, after which the frame C can be turned so that such spindle $k$ will engage in the one of the holes L, L, L, desired.

Having thus described my invention, what I claim as new, and desire to secure by Letters Patent, is—

1. The combination of a stationary base, a movable part fulcrumed to the stationary base so that the plane of the front thereof can be adjustably placed in any plane from a horizontal to a vertical one, and a movable frame having a mirror contained therein, such frame adjustably secured to the fulcrumed movable part so that it can be rotated at any time in a plane parallel with the plane in which such fulcrumed movable part is at any time placed; substantially as described.

2. The combination of a stationary base, a movable part fulcrumed to the movable base so that the plane of the front thereof can be adjustably placed in any plane from a horizontal to a vertical one, and a movable frame adjustably secured to the fulcrumed movable part so that it can be turned at any time in a plane parallel with the plane in which such fulcrumed movable part is at any time placed, and a stop adapted to engage with and hold the adjustable frame in any desired position in relation to the fulcrumed movable part; substantially as described.

3. The combination of a stationary base, a box-like part fulcrumed to the stationary base so that the plane thereof can be adjustably placed in any plane from a horizontal to a vertical one, a front to such box-like part, a flanged ring secured in such front, a movable frame having a mirror contained therein, and clasps secured to such movable frame, such clasps being also adapted to engage with the flange of the ring secured in the front of the box-like part of the device; substantially as described.

4. The combination of a stationary base, a box-like part fulcrumed to the stationary base so that the plane of the front thereof can be adjustably placed in any plane from a horizontal to a vertical one, a front in such box-like part, a flanged ring secured in such front, a movable frame having a mirror contained therein, clasps secured to the movable frame, such clasps adapted to engage with the flange of the ring secured in the front of the box like part, and a stop adapted to engage with and hold the movable frame in any desired and determined position in relation to the box-like part of the device; substantially as described.

JOHN F. WILMOT.

In presence of—
DAVID H. WILSON,
CHARLES TURNER BROWN.